United States Patent [19]
Verner
[11] Patent Number: 4,800,480
[45] Date of Patent: Jan. 24, 1989

[54] VOLTAGE DOUBLER AND SYSTEM THEREFOR

[75] Inventor: Douglas R. Verner, Sterling Heights, Mich.

[73] Assignee: Allied-Signal Inc., Morris Township, Morris County, N.J.

[21] Appl. No.: 115,218

[22] Filed: Oct. 30, 1987

[51] Int. Cl.[4] ............................................ H02M 7/25
[52] U.S. Cl. ...................................... 363/60; 307/110
[58] Field of Search .................... 363/59, 60; 307/109, 307/110; 320/1; 123/479, 480

[56] References Cited

U.S. PATENT DOCUMENTS 4,107,717 8/1978 Klotzner et al. .............. 123/480 X
4,291,369 9/1981 Hochstrate ........................... 363/60

*Primary Examiner*—Peter S. Wong
*Assistant Examiner*—Kristine Peckman
*Attorney, Agent, or Firm*—Markell Seitzman; Russel C. Wells

[57] ABSTRACT

A voltage doubler circuit and system incorporating a plurality of such circuits for energizing in an alternating sequential manner a greater plurality of fuel injectors arranged in groups corresponding to the number of voltage doubler circuits.

28 Claims, 3 Drawing Sheets

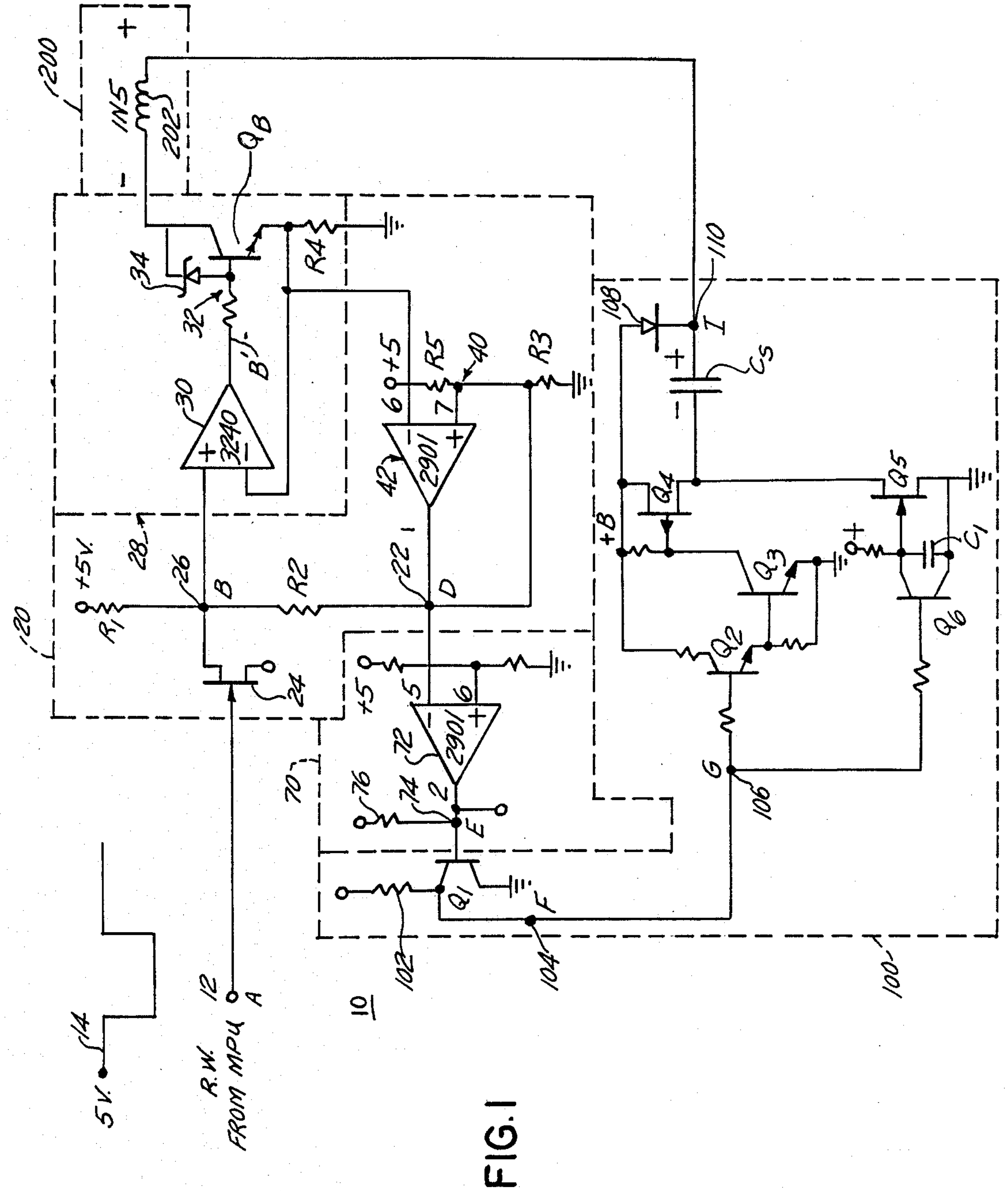
FIG. I

VOLTAGE DOUBLER AND SYSTEM THEREFOR

BACKGROUND AND SUMMARY OF THE INVENTION

This invention relates to a circuit and system for doubling the level of voltage applied to fuel injectors. High performance fuel injectors often require excitation voltages in excess of battery voltage. To achieve this higher voltage, voltage doubler circuits have been used. In a four-cycle engine, which requires fuel injector firing once such two revolutions of the engine, the time available for generating the increased voltage is relatively long. The present invention has been developed for use with engines such as a two-cycle engine in which each injector must fire once per revolution. As such, the luxury of the longer time period of the four-cycle engine is not available. The present invention defines a voltage doubler circuit for a single injector as well as a system employing two voltage doubler circuits which are alternatingly actuated to activate a plurality of fuel injectors arranged in a like plurality of groups. The voltage doubler circuits are capable of generating the increased voltage during the time of peak injector current flow yielding a maximum charge-time for associated capacitors. Such timing and the alternately generation of the charge-time permits overlapping control pulses to be handled easily.

An object of the present invention is to generate a doubled excitation voltage in a relatively short time. A further object of the invention is to control the excitation of a number of fuel injectors with a lesser number of voltage doubler circuits.

Accordingly the invention comprises: a circuit for energzing at least one fuel injector comprising: a voltage doubler circuit connected to a voltage source (B+) and including a charge storage capacitor ($C_S$), means operative during a first mode for causing the storage capacitor to charge to substantially the voltage level of the voltage source and means operative during a second mode from connecting the voltage source and storage capacitor in series; first means in circuit with the fuel injector and the voltage doubler circuit for: selectively completing a current path through the injector to enable and disable current flow therethrough in response to an input control signal, and for regulating the magnitude of the current flowing through the injector to a hold or steady state level; second means responsive to the input control signal and the magnitude of current in the injector for generating a first control signal, the first control signal characterized that during intervals prior to the input control signal such first control signal is maintained in a first state sufficient to cause the voltage doubler circuit to be in its first mode, and during intervals subsequent to the input control signal such first control signal is maintained in a second state sufficient to cause the voltage doubler circuit to be in its second mode. The second means including means for returning the first control signal to its first state after the level of current has reached a predetermined peak level to thereby reset the voltage doubler circuit to its first mode immediately thereafter.

Many other objects and purposes of the invention will be clear from the following detailed description of the drawings.

BRIEF DESCRIPTION OF THE DRAWINGS

Figure 4:
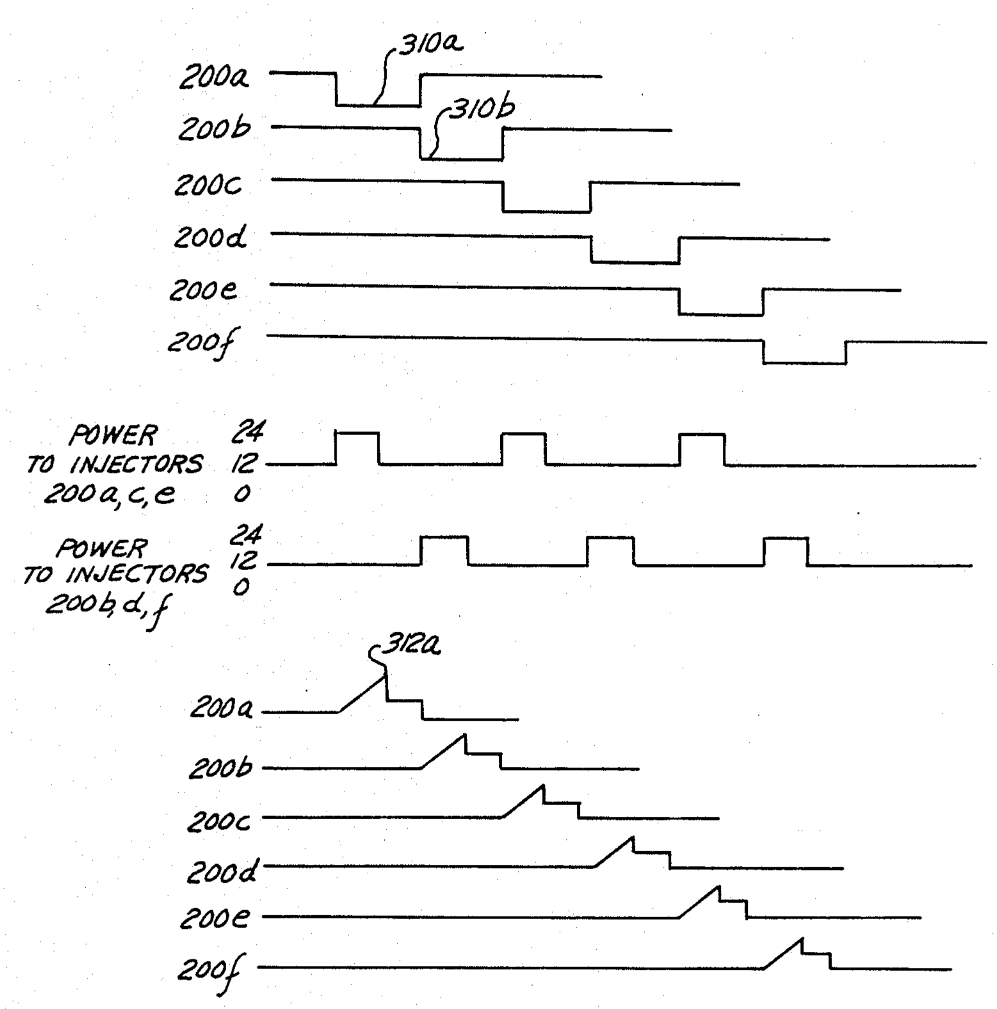

IN THE DRAWINGS:

FIG. 1, illustrates a schematic of the present invention.

Figure 2:
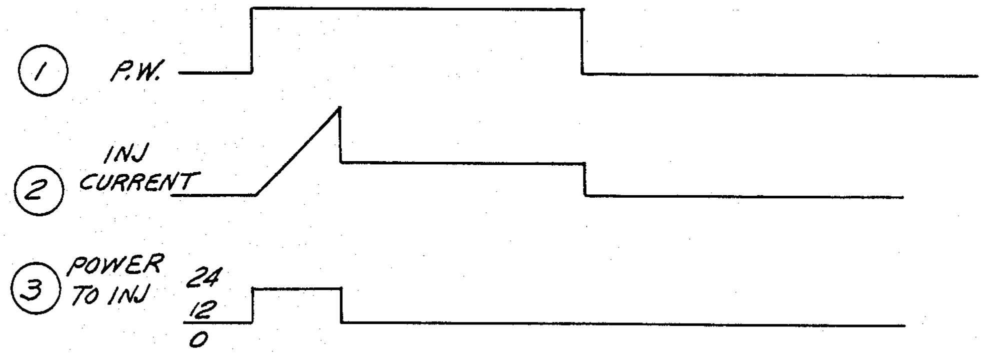

FIG. 2 illustrates a number of waveforms generated by the circuitry of FIG. 1.

Figures 3, 3A:
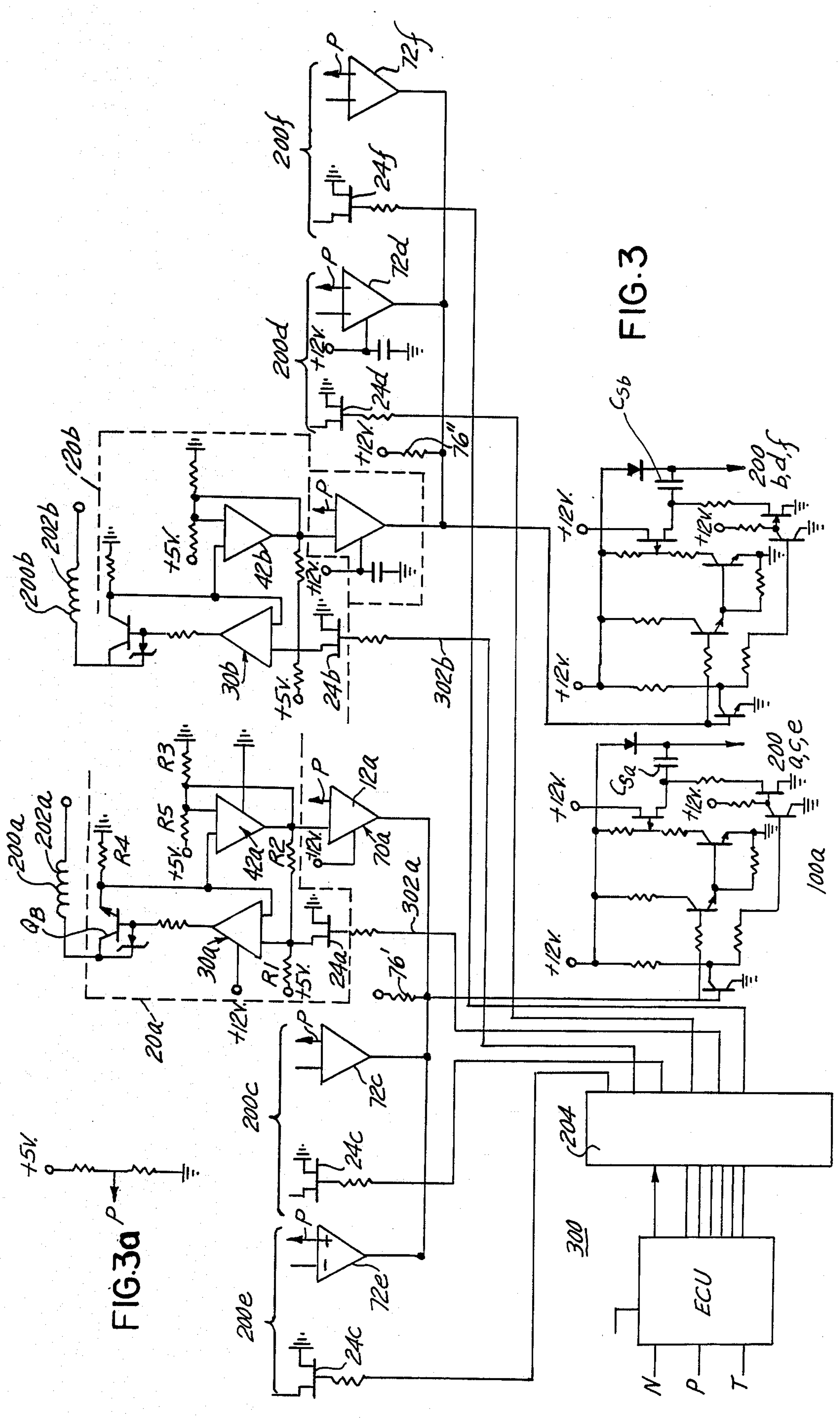

FIG. 3 illustrates a system incorporating the circuitry of FIG. 1.

FIG. 3A illustrates a resistive bridge network as illustrated in FIG. 1.

FIG. 4 illustrates various waveforms generated by the system of FIG. 3.

DETAILED DESCRIPTION OF THE DRAWINGS

FIG. 1 illustrates a circuit generally shown as 10 for generating a voltage signal substantially equal to twice that of a reference or supply voltage. An input node 12 is adapted to receive a control signal such as a negative going pulse 14 generated by an electronic control unit (ECU) not shown. The pulse 14 is communicated to a driver circuit generally designated as 20. The output of the driver circuit at location 22 (or D); generates a control signal which is communicated to a buffer circuit 70. The output of the buffer circuit 70 is used to control a voltage doubler circuit 100. The voltage doubler circuit is connected with a coil 202 of fuel injector 200.

The injector driver circuit 20 receives the input control signal at a first switch such as a field effect transistor 24, the output or drain of which is connected to a circuit location 26 (or B). In the preferred embodiment of the invention, the input signal is normally maintained at a high voltage level and selectively driven low by the negative going control signal 14. The driver circuit 20 additionally provides a path for injector current and includes means for maintaining injector current at a hold or steady state value. The driver circuit 20 further includes a current sink 28 comprising an operational amplifier 30 having negative and positive input terminals and a first bridge network comprising resistors $R_1$, $R_2$, and $R_3$. The circuit location 26 (or B) also corresponds to the junction of resistors $R_1$, and $R_2$ and is connected to the positive terminal of amplifier 30. Resistors $R_2$ and $R_3$ are connected at location 22 (or D) and the remaining terminal of resistor $R_3$ is grounded. As will become clear from the discussion below, the resistors $R_1$, and $R_2$ are used to establish a holding or steady state level of injector current. The output of the amplifier 30, at B′, is connected to a voltage network 32 comprising power transistor $Q_B$ and a Zener diode 34 which is connected between the base and collector of transistor $Q_B$. A resistor $R_4$ is connected between the emitter of transistor $Q_B$ and ground. The output of transistor $Q_B$ is also connected to the negative input of amplifier 30. The driver circuit 20 further includes a second circuit generally shown as 40. The output of this second circuit is a generated control signal which is used to gate the operation of the voltage doubler circuit 100. The circuit 40 comprises a latching comparator 42, of the open collector type, having positive and negative input terminals. The negative input terminal is communicated to output of transistor $Q_B$ in order to generate a voltage indicative of injector current flow. The positive terminal is connected to a second bridge network comprising resistors $R_5$ and $R_3$. The output of the latching comparator 42 is connected to circuit location 22 (D).

The buffer circuit 70 comprises a third comparator 72 of the open collector variety which is connected at its negative input to the output of the driver circuit 20 at circuit location 22. The positive input of amplifier 72 is connected through a voltage divider to a positive voltage potential. The output of operational amplifier or comparator 72, at circuit location 74 (E), is connected to positive potential through a biasing resistor 76 and comprises the output of the buffer circuit. As will be seen from the discussion below, the voltage at 74 (E) is always the complement of the voltage at the output of the driver circuit at 22 (D).

The voltage doubler circuit 100 comprises an input stage including a switch such as transistor $Q_1$. The output of the buffer circuit, at 74, is connected to the base of transistor $Q_1$. The collector of transistor $Q_1$, at location 104, (F), is similarly connected through a resistor 102 to the positive voltage potential while its emitter is connected to ground. It should be appreciated the transistor $Q_1$ can alternatively form the output stage of the buffer circuit 70.

The voltage doubling network 100 further comprises the pair of transistors $Q_2$ and $Q_3$ wherein the base of transistor $Q_2$ at circuit location 106, (G), is resistively coupled to the output of the transistor $Q_1$. The collectors of transistors $Q_2$ and $Q_3$ are connected to a reference voltage, such as the B+ terminal of a twelve volt battery and transistor $Q_2$ is emitter coupled to $Q_3$. The collector of transistor $Q_3$ is resistively coupled to the B+ supply and to the gate terminal of second field effect transistor $Q_4$. Transistor $Q_4$ is connected between B+and ground through a third FET transistor $Q_5$. The output of the transistor $Q_1$ is connected to transistor $Q_5$ through another switching transistor $Q_6$. More specifically, the base of transistor $Q_6$ is resistively coupled to circuit location 104 and includes a capacitor $C_1$ positioned across its emitter and collector to insure that $Q_4$ and $Q_5$ are not on at the same time. The capacitor $C_1$ is also connected to a positive voltage potential. The capacitor $C_1$ is similarly connected across the FET transistor $Q_5$ between its gate and grounded source terminals. The source terminal of transistor $Q_4$ is connected to B+ while its drain terminal which is connected to transistor $Q_5$, and to the negative terminal of a charging capacitor $C_S$. The positive terminal of the charging capacitor is connected to B+through a diode 108. The output of the diode a comprises the output of the voltage doubler (circuit location 110 or I) and is connected across the coil 202 of a fuel injector 200 which in turn is connected to the collector of transistor $Q_B$ to complete a charging circuit for the injector 200.

A purpose of the circuit illustrated in FIG. 1 is to generate a peak voltage that is substantially twice that of the source voltage B+ in order to rapidly actuate the injector 200. The operation of the circuit illustrated in FIG. 1 is as follows:

Prior to receipt of the pulse generated by the ECU, the input 12 (location A) is HIGH or at a reference potential. Such voltage is communicated through the FET 24 which draws the voltage to location 26 (B) to zero, or a LOW voltage state. As can be seen, the output of operational amplifier 30 (B') is similarly at zero (or LOW) which turns transistor $Q_B$ OFF. Consequently, in this mode of operation, there is no current flow through injector 200. In addition, the input of the latching comparator 42 is also maintained at zero since circuit location 22 (D) is resistively coupled to location B. The output of the injector driver circuit 20 at location D is communicated to buffer circuit 70. With the output of the injector driver circuit maintained at zero volts, it can be seen that the output of the buffer circuit at location 74 (E) will go HIGH. This, in turn, turns transistor $Q_1$ ON drawing down the voltage potential at the output of transistor $Q_1$ (at circuit location F). This zero or LOW voltage potential is communicated to transistors $Q_2$ and $Q_3$. In this no-pulse operating mode, transistors $Q_2$ and $Q_3$ are similarly OFF. Further, since the output of the transistor $Q_1$ is similarly resistively coupled to transistor $Q_6$ it is also OFF. With transistor $Q_6$ OFF, the capacitor $C_1$ is permitted to charge; thereby, initially turning transistor $Q_5$ ON. Further, transistor $Q_4$ will be maintained OFF by virtue of the fact that transistor $Q_3$ is similarly OFF. With transistor $Q_4$ OFF and transistor $Q_5$ ON, a charge current path will exist between B+ and ground through the diode 108 and the voltage doubling capacitor $C_S$. By virtue of this charging path, the capacitor $C_S$ will be charged to the B+ potential of approximately 12 volts. As mentioned above, during this no-pulse mode of operation, no current is permitted to flow through the injector 200 by virtue of the fact transistor $Q_B$ is similarly maintained in its OFF state.

Upon the generation of a negative going pulse transmitted from the ECU (see line 1, FIG. 2), the input 12 (location A) is brought LOW. This, in turn, permits the output B' of operational amplifier 30 to go HIGH; thereby, turning ON transistor $Q_B$. The output D of latching comparator 42 is immediately brought HIGH by virtue of its resistively coupling through $R_2$ to location D which drives the output of operational amplifier 72 LOW. This action, turns OFF transistor $Q_1$ permitting its output voltage (at location F) to rise. The now higher voltage at location F drives transistors $Q_2$ and $Q_6$ ON. Correspondingly, by driving transistor $Q_2$ ON, transistor $Q_3$ will be maintained in its ON state. Further, as can be seen with transistor $Q_6$ turned ON, transistor $Q_5$ will shortly and very quickly be turned OFF as the voltage across capacitor $C_1$ decays. In response to the above, the transistor $Q_4$ is now turned ON which effectively brings the negative terminal of the charging capacitor $C_S$ from ground potential to B+. As can be seen, the voltage between the positive terminal of the charging capacitor $C_S$ (across B+) and ground is now doubled, i.e. approximately 24 volts (see line 3, FIG. 2). Such doubled voltage is now applied across the injector 200 which causes a rapid rise in injector current which is permitted to flow from the series connection of the charging capacitor and the reference source B+ through the injector to ground through transistor $Q_B$ which had previously been turned ON (see line 2, FIG. 2).

It is desirable once the flow through the injector has reaced a peak value of current, thereby insuring the rapid energization of the injector, that the current flow through the injector be reduced to a hold or steady state value and that the voltage doubler circuit 100 be returned to its initial state as rapidly as possible to insure that the charging capacitor $C_S$ is allowed to once again be charged to the potential of the supply voltage B+. The effect of the discharging of capacitor $C_S$ has not been shown in FIG. 2. As the current flows across the injector coil 202 to ground, a voltage is generated across resistor $R_4$ which is indicitive of current flow. When this voltage potential equals a voltage corresponding to peak injector current, the latching comparator 42 will generate a negative going signal thereby latching its output at circuit location 22 to a LOW voltage state. The voltage at which the latching comparator 42 switches its state is defined by the resistive bridge network 40 comprising resistors $R_3$ and $R_5$. Upon reducing the voltage at the output of the driver circuit 20 (circuit location 22), the operational state of the various components within the buffer circuit 70 and the voltage doubler circuit 100 will be returned to the above described "no-pulse" operational state. In this "no-pulse" state, transistor $Q_4$ is maintained OFF while transistor $Q_5$ is maintained in its ON state. The change in state of the above components produces two effects. The first effect is to effectively place the charging capacitor $C_S$ in parallel with the supply voltage B+, thereby permitting the charging capacitor to once again be charged to the value of this supply voltage. In addition, the power supplied to the injector has now been reduced to the value of the reference voltage (B+). With the power to the injector 200 now reduced to the reference voltage, the current flowing through the injector will be reduced and is maintained at a hold or steady state level by the operation of the current sink 30. The value of the hold current is established by the voltage drop across the resistive bridge network comprising resistors $R_1$ and $R_2$. Such value of hold current will be maintained throughout the duration of the pulsed control signal. Upon termination of the pulsed control signal, the state of the various components within the circuit 10 will be returned to their "no-pulse" condition described above awaiting receipt of subsequent pulses.

Reference is now made to FIG. 3, which illustrates a circuit 200 for the sequential energization of a plurality of fuel injectors. While the circuit illustrated in FIG. 3 is designed to energize six fuel injectors 200 *a–f*, in a sequential manner, the invention is not so limited. Associated with each fuel injector 200 *a–f* is a respective drive circuit 20*a–f*. These drive circuits are identical to the circuit illustrated in FIG. 1. It should be noted that FIG. 3 illustrates two (20*a*, 20*b*) of the six injector drive circuits. Each drive circuit comprises a transistor input stage 24, resistors $R_1$–$R_6$, current sink 30 having a transistor output stage comprising transistor $Q_B$, and the latching comparator 42. Similarly, associated with each fuel injector is the buffer circuit 70 which includes the comparator 72. Reference is briefly made to FIG. 1, and in particular, reference is made to the output of comparator 72 at circuit location 74. The output of this comparator 72 is resistively coupled to a reference voltage potential through the resistor 76. For efficiency of implementation, pairs of three comparators 72*a,c,e* and 72*b,d,* and f are connected to the reference supply through resistors 76′ and 76″. The positive input of each of the comparators 72 is connected to a reference voltage potential through the resistive bridge network as illustrated in FIG. 3*a* in the same manner as illustrated in FIG. 1. Further, it should be noted that in FIG. 3 only the transistor input stages 24*c*–24*f* and corresponding buffer circuits 70*c* and 70*f* have been illustrated, the remaining circuitry is identical to those illustrated for injectors 200*a* and 200*b*.

As mentioned above, the six fuel injectors 200 are arranged in two banks of three alternately energizable fuel injectors. That is, in a fuel system having six injectors wherein the sequence of operation of the fuel injectors is 200 *a, b, c, d, e,* and *f*, the fuel injectors 200*a, c* and *e* and the fuel injectors 200*b, d,* and *f* comprise the above banks of fuel injectors and related circuits. Each of the fuel injectors 200 is controlled by the ECU 202 and a buffer or driver circuit 204 of known variety which controls the operation of each of the individual injectors 200. More specifically, the ECU 202 and buffer circuit 204 cooperate to maintain the input to the various transistor switches 24 at a positive voltage potential and cooperate to sequentially transmit individual pulses to each of these transistor switches 24. Reference is made to FIG. 4, lines 1–6 which illustrates sequential generation of input pulses for each of the various driver circuits 20*a*–20*f*. These signals are generated in response to engine load demand and may be responsive to engine speed N, manifold pressure P, temperature T, or other such operational parameters as commonly used in fuel injection systems. Further, for the purpose of illustration, the various pulses generated by the ECU 202 have been shown as non-overlapping. However, this is not a limitation of the present invention. The output of each of the various comparators 72*a, c,* and *e* and 72*b, d,* and *f*, are communicated respectively through the resistors 76′ and 76″ to one of two identical voltage doubler circuits 100*a* and 100*b*. The voltage doubler circuits 100*a* and 100*b* are identical to the circuit 100 illustrated in FIG. 1. The respective storage capacitor has been designated as $C_{Sa}$ and $C_{Sb}$. The output of the various voltage doubler networks 100 are connected to the respective coils 202*a*–202*f* of the injectors associated with each bank of fuel injectors. More specifically, the output of the charge capacitor $C_{Sa}$ is communicated to injectors 202*a*, 202*c* and 202*e*, while the output of the storage capacitor $C_{Sb}$ is communicated to injectors 200*b*, 200*d*, and 200 *f*.

The operation of the circuit 300 illustrated in FIG. 3 is substantially identical to the circuit of FIG. 1 with the exception that each voltage doubler circuit controls the energization of three fuel injectors. As an example, prior to the generation of the negative going pulse, the ECU 202 and buffer 204 cooperate to generate a positive voltage which is communicated to one transistor switch such as switch 24*a* through line 302*a*. This initializes the states of the various components as described in FIG. 1 and permits the storage capacitor $C_{Sa}$ to charge to the value of the power supply. Similarly, prior to the generation of a pulse for injector 200*b*, the storage capacitor $C_{Sb}$ is similarly charged to the power supply potential. Upon the generation of the first pulse 310*a* (see FIG. 4, line 1), the doubled voltage is applied to injector 200*a*. When the injector current reaches a peak value 312*a* (see FIG. 4), the latching comparator 42*a* returns the voltage doubler circuit 100*a* to a state which enables the storage capacitor $C_{Sa}$ to again charge to the potential of the reference supply. Upon generation of the next pulse 310*b* to the injector to be subsequently fired, such as injector 200*b*, the double voltage formed across capacitor $C_{Sb}$ is applied to such fuel injector. As the current in the fuel injector 200*b* reaches its peak value, the latching comparator 42*b* generates a signal to return the voltage doubler circuit 100*b* to a state permitting the storagae capacitor $C_{Sb}$ to once again charge to the power supply potential. Thereafter, the charge capacitors $C_{Sa}$ and $C_{Sb}$ of the voltage doubler networks 100*a* and 100*b* are alternately charged and discharged in response to the subsequent alternate energization of the fuel injectors in the paired banks of fuel injectors.

Many changes and modifications in the above described embodiment of the invention can, of course, be carried out without departing from the scope thereof.

Accordingly, that scope is intended to be limited only by the scope of the appended claims.

I claim:

1. A device for energizing at least one coil comprising:

voltage doubler circuit connected to a voltage source and including a charge storage capacitor, means operative during a first mode for causing the storage capacitor to charge to substantially the voltage level of the voltage source and means operative during a second mode for connecting the voltage source and storage capacitor in series.

first means in circuit with a coil and the voltage doubler circuit for: selectively completing a current path through the coil to enable and disable current flow therethrough in response to an input control signal, and for regulating the magnitude of the current flowing through the coil to a hold or steady state level;

second means responsive to the input control signal and the magnitude of current in the coil for generating a first control signal, the first control signal characterized that during intervals prior to the input control signal such first control signal is maintained in a first state sufficient to cause the voltage doubler circuit to be in its first mode, and during intervals subsequent to the input control signal such first control signal is maintained in a second state sufficient to cause the voltage doubler circuit to be in its second mode, and the second means including means for returning the first control signal to its first state after the level of current has reached a predetermined peak level to thereby reset the voltage doubler circuit to its first mode.

2. The device as defined in claim 1 wherein the voltage doubler circuit further includes a first switch switchable between an ON state and an OFF state in response to the first control signal such that when in such ON state, a first current path is formed enabling the storage capacitor to be changed by the voltage source.

3. The device as defined in claim 2 wherein the first current path includes the series connection of the voltage source, a diode, the storage capacitor and the first switch.

4. The device as defined in claim 2 wherein the voltage doubler circuit includes a second switch, responsive to the first control signal, in circuit with the voltage source and the storage capacitor, the second switch having ON and OFF states which are the complements of the states of the first switch, such that when the second switch is in its ON state the voltage source and storage capacitor are connected in series and communicated to the coil.

5. The device as defined in claim 4 wherein the first means includes a current sink comprising an operational amplifier input stage, and power transistor output stage, the power transistor connected in series with the injector coil, and having is emitter terminal connected to ground through a first resistor and to a negative input of the operational amplifier, a first bridge network comprising a series connection of a plurality of resistors, including second and third resistors connected at a first function, said first function is connected to a positive input of the operational amplifier and said first junction also connected to an output of a third switch, the input of which is adapted to receive the input control signal and wherein the first bridge network includes a fourth resistor connected to the third resistor at a second junction.

6. The device as defined in claim 5 wherein the third switch comprises an FET transistor having its drain terminal connected to the first junction, its source terminal grounded and its gate terminal adapted to receive the input control signal.

7. The device as defined in claim 6 wherein the input control signal comprises a negative pulse superimposed on a positive constant voltage carrier signal.

8. The device as defined in claim 5 wherein the first bridge network is operative to establish the level of hold current in the coil.

9. The device as defined in claim 5 wherein the second means comprises a latching comparator having its negative input connected to sense a voltage indicative of the coil current and its positive input connected to a second bridge network which is set to generate a voltage corresponding to a preset level of coil current, an output terminal of the latching comparator connected to the second junction, wherein the signal generated at the second junction corresponds to the first control signal and wherein the latching comparator is operative to generate an output signal when the coil current is equal to the preset level.

10. The device as defined in claim 9 wherein the second bridge network comprises a fifth resistor and one side of the fourth resistor wherein the junction of the fourth and fifth resistors are communicated to a negative input terminal of the latching comparator and the other side of the fourth resistor is grounded.

11. The device as defined in claim 9 wherein the second means includes a buffer network for communicating the first control signal from the first junction to the voltage doubler circuit.

12. The device as defined in claim 11 wherein the buffer network comprises an open collector type comparator, a negative input terminal of which is connected to the second junction, a positive terminal of which is biased positively, an output of which is resistively coupled to the second voltage source and connected to an input terminal of a fourth transistor switch, having its emitter grounded and its output or collector terminal connected to a voltage source and communicated to the voltage doubler circuit.

13. The device as defined in claim 1 wherein the coil is a coil of a fuel injector.

14. The system as defined in claim 5 wherein each first bridge network is operative to establish the level of hold current in the coil.

15. The system as defined in claim 14, wherein each second means comprises a latching comparator having its negative input connected to sense a voltage indicative of the injector current and its positive input connected to a second bridge network which is set to generate a voltage corresponding to a preset level of injector current, an output terminal of the latching comparator connected to the second junction, wherein a signal generated at the second junction corresponds to the first control signal and wherein the latching comparator is operative to generate an output signal when the injector current is equal to the preset level.

16. The system as defined in claim 15 wherein each second bridge network comprises a fifth resistor and the fourth resistor wherein the junction of the fourth and fifth resistors are communicated to a negative input terminal of the latching comparator and another terminal of the fourth resistor is grounded.

17. The system as defined in claim 16 wherein each second means includes a buffer network for communicating the first control signal from the first junction to a respective voltage doubler circuit.

18. The system as defined in claim 17 wherein each buffer network comprises an open collector type comparator, a negative input terminal of which is connected to the second junction, a positive terminal of which is biased positively, wherein an output of each buffer network corresponding to the coils of each particular group of coils are connected in common and to a second voltage source, such common connection also connected to a fourth transistor switch, one for each voltage doubler circuit, and communicated to its corresponding voltage doubler circuit.

19. The system as defined in claim 18 wherein the plurality of voltage doubler circuits, and plurality of groups of coils is two.

20. A circuit for generating a doubled voltage to actuate a coil of fuel injector having various modes of operation comprising:

injector driver means responsive to an input control signal comprising:

a first switch for generating an output signal switchable from a LOW voltage state during a first mode to a HIGH voltage state during a second mode corresponding to receipt of a control signal;

a current sink circuit including an output stage comprising a second switch, the OFF and ON states of which are controlled in correspondence with the output of the first switch;

the second switch comprising a power transistor, its collector connected to a injector coil and its emitter connected to ground through a first resistor;

a latching comparator, an output of which is resistively connected to the output of the first switch and responsive to a voltage drop across the first resistor for causing its output to latch to a LOW voltage state;

first comparator means, responsive to the output signal of the latching comparator, for generating an output signal that is the complement thereof;

voltage circuit means connected to a power source to the injector coil, for generating a voltage signal substantially twice that of the magnitude of the power source comprising: a third switch for generating an output signal which is the complement of the output of the first comparator means, a storage capacitor connected to ground through a fourth switch for opening and closing such grounded connection; fifth switch means for selectively connecting the storage capacitor to the power source, means for selectively changing the states of the fourth and fifth switches to create a first current path to ground through the storage capacitor to permit such capacitor to charge to substantially the level of the power source, such that the voltage between the capacitor and ground is substantially twice that of the power source and for connecting the power source and storage capacitor in series across the injector coil.

21. A system for exciting the coils of a plurality of fuel injectors, comprising:

a plurality of voltage doubler circuits, each circuit connected to a voltage source, including respective charge storage capacitors;, each circuit including first and second modes of operation; means, operative during the first mode, for causing the storage capacitors to alternatively charge to substantially the voltage level of the voltage source, and means, operative during the second mode for connecting the voltage source in series with a respective one of the storage capacitors to generate voltage signals relative to ground potential equal to approximately twice the potential of the voltage source, wherein a plurality of fuel injectors, each including a corresponding coil are arranged in a plurality of groups, the number of groups corresponding to the number of voltage doubler circuits, and wherein the injector coils of each group are connected to a corresponding storage capacitor, and associated with each coil is:

first means in circuit with such coil and its corresponding voltage doubler circuit for: selectively completing a current path through the coil to enable and disable current flow therethrough in response to an input control signal, and for regulating the magnitude of the current flowing through such coil to a hold or steady state level;

second means responsive to an input control signal and the magnitude of current in the coil for generating a first control signal, the first control signal characterized that during intervals prior to receipt of an input control signal such first control signal is maintained in a first state sufficient to cause the corresponding voltage doubler circuit to be in its first mode, and during an interval subsequent to the input control signal such first control signal is maintained in a second state sufficient to cause such voltage doubler circuit to be in its second mode, and the second means including means for returning the first control signal to its first state after the level of current in such injector has reached a predetermined peak level to thereby reset such voltage doubler circuit to its first mode;

means for generating the input control signals in a predetermined sequence and for alternatively and sequentially communicating individual input control signals to respective first means of the coils of the plurality of groups of coils.

22. The system as defined in claim 21, wherein each voltage doubler circuit further includes a first switch switchable between an ON state and an OFF state in response to a corresponding first control signal generated by corresponding first means, such that when in such ON state, a first current path is formed enabling the storage capacitor to be changed by the voltage source.

23. The system as defined in claim 22 wherein the first current path includes the series connection of the voltage source, a diode, the respective storage capacitor and the first switch.

24. The system as defined in claim 23 wherein each voltage doubler circuit includes a second switch, responsive to such first control signal, in circuit with the voltage source and its storage capacitor, the second switch having ON and OFF states which are the complements of the states of the first switch, such that when the second switch is in its ON state the voltage source and storage capacitor are connected in series and communicated to the coils of one of the groups of coils.

25. The system as defined in claim 24 wherein each first means includes a current sink comprising an operational amplifier input stage, and power transistor output stage, the power transmitter connected in series with a respective one of the coils, and having its emitter terminal connected to ground through a first resistor and to a negative input of the operational amplifier, a first bridge network comprising a series connection of a plurality of resistors, including a second and a third resistor connected at a first junction, said first junction is connected to a positive input of the operational amplifier and said first junction also connected to an output of a third switch, ân input of which is adapted to receive a respective input control signal and wherein the first bridge network includes a fourth resistor at a second junction.

26. The system as defined in claim 25 wherein the third switch comprising an FET transistor having its drain terminal connected to the first junction, its source terminal grounded and its gate terminal adapted to receive the input control signal.

27. The system as defined in claim 26 wherein each input control signal comprises a negative pulse superimposed on a positive constant voltage carrier signal.

28. The system as defined in claim 21 wherein the fuel injector comprises part of a two-cycle engine and wherein a generating means generates a control signal for each injector once per engine revolution.

* * * * *